United States Patent
Bollig

(10) Patent No.: US 8,621,835 B2
(45) Date of Patent: Jan. 7, 2014

(54) TRASH FINGER

(75) Inventor: Dennis Bollig, Fenton, IA (US)

(73) Assignee: Dragotec USA, Inc., Fenton, IA (US)

( * ) Notice: Subject to any disclaimer, the term of this patent is extended or adjusted under 35 U.S.C. 154(b) by 10 days.

(21) Appl. No.: 13/334,957

(22) Filed: Dec. 22, 2011

(65) Prior Publication Data

US 2013/0160416 A1     Jun. 27, 2013

(51) Int. Cl.
*A01D 45/02* (2006.01)

(52) U.S. Cl.
USPC .......................................................... 56/119

(58) Field of Classification Search
USPC ............... 56/14.3, 14.5, 16.1, 17.3, 119, 364,
56/400, 12.4, 12.5, 14.4, 16.2, 220, 221,
56/226, 227; 460/114; 198/657, 659, 671,
198/533, 692, 722, 693
See application file for complete search history.

(56) References Cited

U.S. PATENT DOCUMENTS

| | | | | |
|---|---|---|---|---|
| 3,340,935 A | * | 9/1967 | Csimma | 171/14 |
| 3,589,111 A | * | 6/1971 | Gullickson et al. | 56/12.8 |
| 3,719,034 A | * | 3/1973 | Lange | 56/119 |
| 3,742,687 A | | 7/1973 | Kalkwaf | |
| 3,742,689 A | * | 7/1973 | Barows et al. | 56/226 |
| 4,085,570 A | * | 4/1978 | Joray et al. | 56/2 |
| 4,137,695 A | * | 2/1979 | Sammann | 56/119 |
| 4,142,348 A | * | 3/1979 | Jordan et al. | 56/10.2 R |
| 4,476,667 A | * | 10/1984 | Moss | 56/119 |
| 4,584,825 A | * | 4/1986 | Atkinson | 56/119 |
| 4,967,544 A | * | 11/1990 | Ziegler et al. | 56/10.2 R |
| 5,980,383 A | * | 11/1999 | Medley | 460/114 |
| 6,672,042 B2 | * | 1/2004 | Gengenbach | 56/119 |
| 7,373,767 B2 | | 5/2008 | Calmer | |
| 7,377,091 B2 | | 5/2008 | Shelton et al. | |
| 2002/0073673 A1 | | 6/2002 | Gengenbach | |
| 2007/0204588 A1 | | 9/2007 | Neece | |
| 2007/0204591 A1 | * | 9/2007 | Reitzel | 56/400 |
| 2008/0282661 A1 | | 11/2008 | Gengenbach et al. | |

* cited by examiner

*Primary Examiner* — Thomas B Will
*Assistant Examiner* — Mai Nguyen
(74) *Attorney, Agent, or Firm* — Kinney & Lange, P.A.

(57) ABSTRACT

A corn head includes a frame, an auger, and a finger. The frame includes a feeder house opening and a trough located in front of the feeder house opening. The auger is rotatably mounted in the trough and includes flighting for directing material into the feeder house opening. The finger is attached to the auger and extends radially outward from the auger. The finger is flexible and rotates along with the auger.

16 Claims, 5 Drawing Sheets

TRASH FINGER

BACKGROUND

The present disclosure relates generally to corn heads for use with combines and more specifically to an accessory for corn heads.

Corn heads are commonly attached to combines in order to harvest corn. The corn head removes ears of corn from the stalks and conveys them to a collection container within the combine. Gathering points, which are located on the front of the corn head, guide each row of corn into a row unit of the corn head. Once within the row unit, snapping chains break off the stalks. The ears, as well as debris, move rearward in the corn head to a cross auger, which conveys the ears and debris to a collection chamber in the combine.

Combine operators routinely encounter difficulties when harvesting corn. One such difficulty is a build up of debris in front of a feeder house opening to the combine. This debris is made up of corn stalks, leaves, and "fluff" (fine particles of ground up stalks and leaves). Advances in plant science caused an increase in the amount of debris experienced by the combine operator. For example, today's corn varieties retain their leaves longer, and are planted more densely. Corn yields have also been increased, at least in part, by genetic improvements to the corn plant. A yield increase has brought with it larger, healthier corn plants that produce larger amounts of debris that may potentially break off the stalk. Severe debris buildup occurs in dry harvest conditions.

SUMMARY

In one embodiment, a corn head includes a frame, an auger, and a finger. The frame includes a feeder house opening and a trough located in front of the feeder house opening. The auger is rotatably mounted in the trough and includes a tube and flighting for directing material into the feeder house opening. The finger is attached to the auger and extends radially outward from the auger. The finger is flexible and rotates along with the auger.

In another embodiment, an attachment for a combine includes an auger and a finger. The auger has flighting for directing material to a feeder house opening. The flighting extends radially a first distance from the auger. The finger has a fixed end secured to the auger adjacent the flighting, and a free end extending radially a second distance from the auger. The second distance for the finger is greater than the first distance for the flighting.

In yet another embodiment, a corn head includes plurality of snouts, a plurality of row units, a frame, an auger, and a finger. The snouts are located at a front of the corn head. Each snout includes a gathering point for guiding material into the corn head. The row units are located behind the snouts. Each row unit includes a bonnet attached to one of the snouts and chains beneath the bonnet for conveying the material rearward along the corn head. The frame is located behind the row units. The frame includes a trough for collecting material received from the plurality of row units and a feeder house opening for transferring the material to a combine. The auger is rotatably mounted in the trough. The auger includes a tube and flighting extending radially from the tube for directing the material into the feeder house opening. The finger is attached to the auger. The finger extends radially outward from the auger and contacts the trough during rotation.

DETAILED DESCRIPTION

Figure 1:
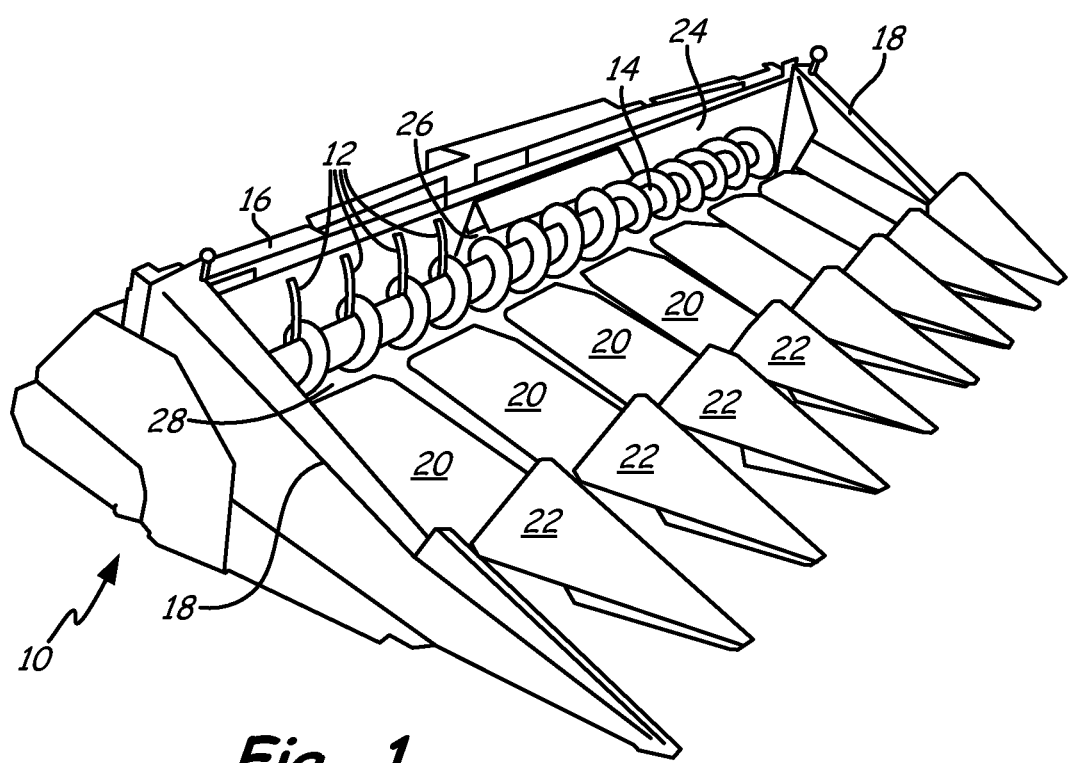
FIG. 1 is a perspective view of a corn head having a finger attached to an auger.

FIG. 1 is a perspective view of a corn head 10 having finger 12 attached to auger 14. Corn head 10 includes finger 12, auger 14, frame 16, side boards 18, bonnets 20, and snouts 22. Frame 16 includes back panel 24, feeder house opening 26, and trough 28. Snouts 22 guide material, such as a row of corn, rearward into corn head 10, and auger 14 moves the material centrally to feeder house opening 26. Finger 12 rotates with auger 14 to clear debris from corn head 10.

Finger 12 is attached to auger 14, which is housed inside of frame 16. Frame 16 defines a rear end of corn head 10 and is configured to attach to a combine (not shown) as known to one skilled in the art. Side boards 18 are attached perpendicularly to sides of frame 16 and extend forward to define the sides of corn head 10. A plurality of bonnets 20 are attached to a front of frame 16 and are located between side boards 18. Bonnets 20 extend forward from, and perpendicular to, frame 16. Bonnets 20 are located between auger 14 and snouts 22. A plurality of snouts 22 extend forward from, and parallel to, the plurality of bonnets 20. Each snout 22 has a rear end attached to one bonnet 20 and a forward end having a gathering point. The gathering points of snouts 22 define a forward end of corn head 10. Snouts 22 act as teeth of a comb by guiding single rows of corn stalks into corn head 10. After passing through snouts 22, corn encounters row units (not visible), which are protected by bonnets 22. The row units cut stalks while passing corn material rearward to auger 14 rotating within frame 16.

Frame 16 includes back panel 24, which extends vertically and defines a rear of corn head 10. Located in an approximate center of back panel 24 is feeder house opening 26, which opens to the combine. Extending forward from back panel 24 is trough 28. Auger 14 is rotatably mounted within trough 28. Corn exits row units beneath bonnets 20 and is conveyed centrally within trough 28 by the rotation of auger 14. More specifically, auger 14 moves corn toward feeder house opening 26, for exiting corn head 10 and entering a grain processing unit of the combine. Auger 14 has flighting which is slanted centrally from both ends toward feeder house opening 26, which insures central movement of corn and debris.

Corn head 10 can become blocked by build-up of debris. Stalks, weeds, fluff (i.e. fine particles of ground up stalks) or other material tends to accumulate on top of corn head 10 and/or in auger 14 and trough 28. This blockage prevents the free flow of ears from corn head 10 to the combine via feeder house opening 26. Debris buildup is further exacerbated by dry field conditions. The task of manually dislodging debris is time consuming and can result in injury to the operator. In the present disclosure, corn head 10 is equipped with an accessory for automatically reducing debris accumulation.

Namely, finger 12 is attached to auger 14 and rotates therewith to continually encourage debris movement toward feeder house opening 26. A plurality of fingers 12 can be attached to auger 14 where each finger is aligned centrally with a row unit. Use of one or more fingers 12 reduces the likelihood of corn head 10 becoming plugged and no longer functioning as intended.

Figure 2:
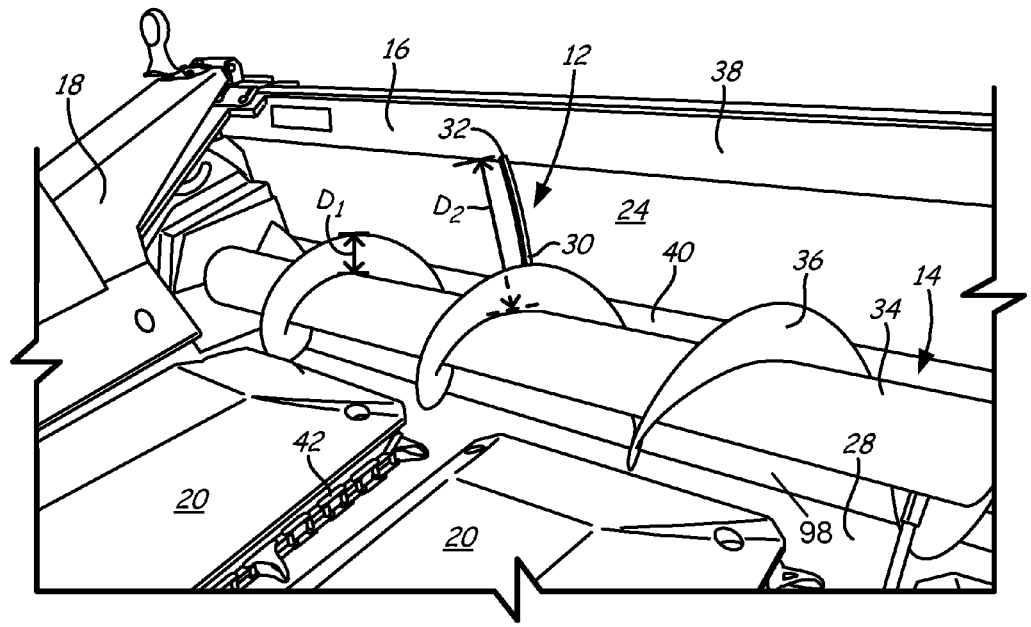
FIG. 2 is an enlarged perspective view of the finger and auger from FIG. 1 in a first position.
Figure 3:
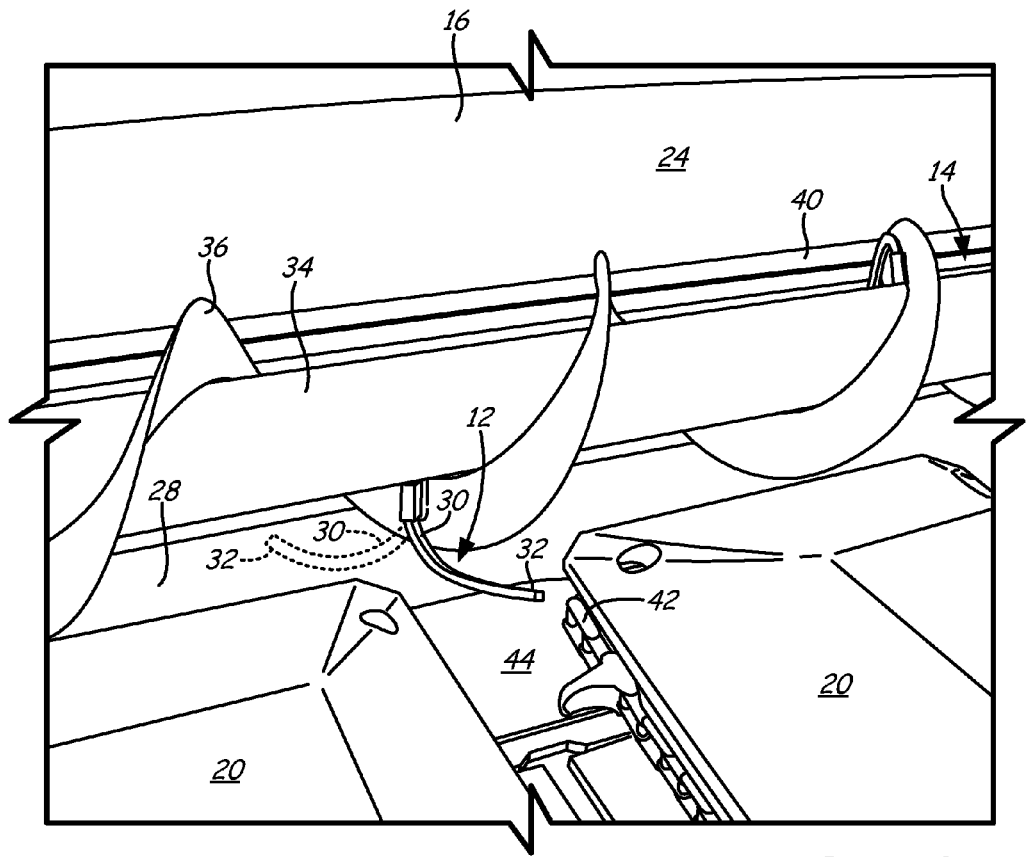
FIG. 3 is an enlarged perspective view of the finger and auger from FIG. 1-2 in a second position.

FIG. 2 is an enlarged perspective view of finger 12 and auger 14 from FIG. 1 in a first position and FIG. 3 is an enlarged perspective view of the same in a second position. Depicted in FIGS. 1 and 2 are finger 12, auger 14, frame 16, side board 18, bonnets 20, back panel 24, and trough 28. Finger has fixed end 30 and free end 32. Auger 14 includes tube 34 and flighting 36. Back panel 24 has top 38 and bottom 40. Also shown are chains 42 and gearbox 44 for a row unit beneath bonnet 20. Finger 12 is attached to auger 14 and rotates along with auger 14 to prevent debris accumulation in and around trough 28.

Finger 12 is substantially rectangular and defined by fixed end 30 and an opposite free end 32. Fixed end 30 of finger 12 is attached to auger 14. Auger 14 has tube 34 extending horizontally across trough 28 in a direction perpendicular to back panel 24. Both ends of tube 34 are attached to frame 16. Flighting 36, a helical blade, is spirals along tube 34. Flighting 36 extends outwardly a first distance D1 from tube 34. Fixed end 30 of finger 12 is attached to either tube 34 or flighting 36 and extends outwardly to free end 32, which is located a second distance D2 from tube 34. Free end 32 of finger 12 extends beyond flighting 36. In other words, distance D2 (tube 34 to free end 32) is greater than distance D1 (tube 34 to end of flighting 36). In the depicted embodiment, D2 is approximately twice D1. Back panel 24 of frame 16 is substantially vertical and bounded by top 38 and bottom 40. Bottom 40 is attached to a rear side of trough 28 and can include a stripper bar 98. Attached to a front side of trough 28 are row units located under bonnets 20. The row units include chains 42 that are driven by gearbox 44. Gearbox 44 is the rearmost component of row unit and is therefore, attached to front end of trough 28.

Finger 12 is attached to either tube 34 or flighting 36 and therefore, rotates along with auger 14. Finger 12 is formed from a flexible, yet durable material (e.g. metal, cable, belting, plastic, rubber) and is configured to bend during rotation of auger 14. FIG. 2 is a still image of auger 14 at one moment of rotation when finger 12 is pointed substantially vertically upwards, and FIG. 3 is a still image of auger 14 at an approximately opposite side of a single rotation when finger 12 is curving (dotted line) and rebounding (solid line) at a forward end of trough 28. As shown in FIG. 2, free end 32 extends upwardly in an approximately straight line from fixed end 30. As auger 14 rotates rearward toward back panel 24, free end 32 of finger 12 contacts top 38 and then bottom 40 of back panel 24. If a stripper bar is located near bottom 40, finger 12 will also contact the stripper bar. Around the location of attachment between bottom 40 and rear end of trough 28, free end 32 of finger 12 begins to bend or curve. Free end 32 curves because the distance between tube 34 and a bottom of trough 28 is less than the distance of finger 12 extending from auger 14 or distance D2. As shown by a dotted line in FIG. 3, finger 12 remains curved while located between auger 14 and bottom of trough 28 (see dotted line in FIG. 3). Once free end 32 clears bottom of trough 28 it rebounds and flings forward to its extended position, as shown by a solid line in FIG. 3. During this rebound, free end 32 contacts a fill plug on gearbox 44 between counter-rotating chains 42 of row units. Continued rotation of auger 14 returns finger 12 to the upright position depicted in FIG. 2. The bending, rebounding, and extending of finger 12 during rotation of auger 14 aids in freeing debris from trough 28. Finger 12 repeatedly contacts debris accumulations with force to break up and free the debris for central movement by auger 14.

Figure 4:
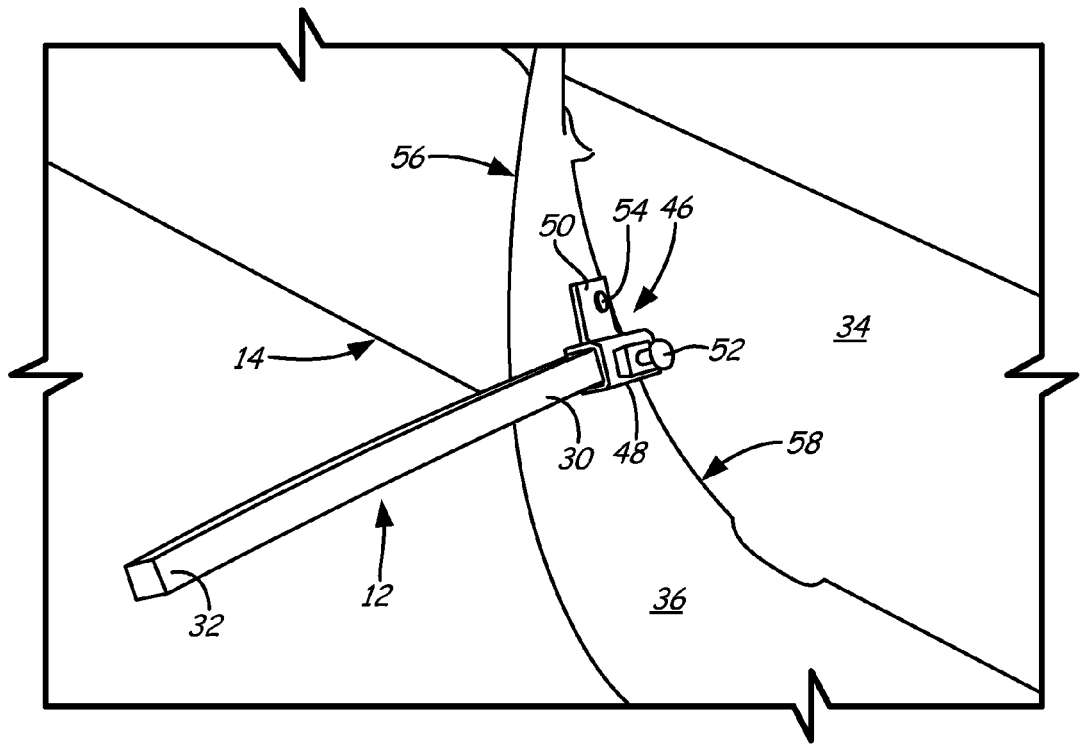
FIG. 4 is an enlarged perspective view of the finger and associated bracket attached to the auger from FIGS. 1-3.
Figure 5:
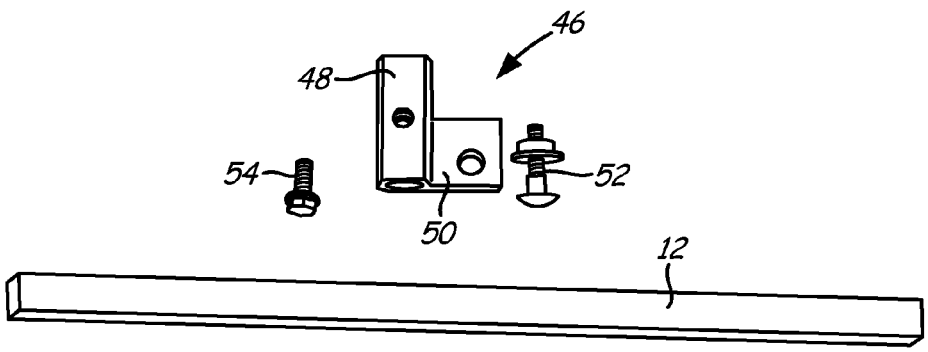
FIG. 5 is a top view of the finger and bracket removed from the auger of FIGS. 1-4 and disassembled.

FIG. 4 is an enlarged perspective view of finger 12 and bracket assembly 46 attached to auger 14 from FIGS. 1-3. Depicted in FIG. 4 are finger 12, auger 14, fixed end 30, free end 32, tube 34, flighting 36, and bracket assembly 46. Bracket assembly 46 includes body 48, appendage 50, first bolt 52, and second bolt 54. Flighting 36 has center facing surface 56 and an opposite outer facing surface 58. FIG. 5 is a top view of finger 12 and bracket assembly 46 removed from auger 14 and dissembled to show components. Depicted in FIG. 5 are finger 12, bracket assembly 46, body 48, appendage 50, first bolt 52, and second bolt 54. In the embodiment of FIGS. 4-5, bracket assembly 46 is configured to secure fixed end 30 of finger 12 to fighting 36.

Flighting 36 of auger 14 has center facing surface 56 and an opposite outer facing surface 58. As indicated by name, center facing surface 56 faces a center of corn head 10 (i.e. feeder house opening 26 shown in FIG. 1) while outer facing surface 58 faces ends of corn head 10 (i.e. side boards 18 shown in FIG. 1). In the embodiment of FIG. 4, finger 12 is secured to outer facing surface 56 by bracket assembly 46. Body 48 is substantially rectangular and tubular to receive fixed end 30 of finger 12. Appendage 50 is attached to, and extends perpendicularly from, body 48. Both body 48 and appendage 50 include a central hole for receiving first bolt 52 and second bolt 54, respectively. Once fixed end 30 is received into body 48, first bolt 52 is inserted through the central hole of body 48 to secure fixed end 30 within body 48. Hole in appendage 50 is then aligned with a hole drilled into outer facing surface 58 of flighting 36. Second bolt 54 is inserted through hole in appendage 50 and hole in outer facing surface 58, thereby securing appendage 46, body 48, and finger 12 to flighting 36, although the invention is not so limited. Any means for securing finger 12 to auger 14 is within the scope of this disclosure.

Figure 6:
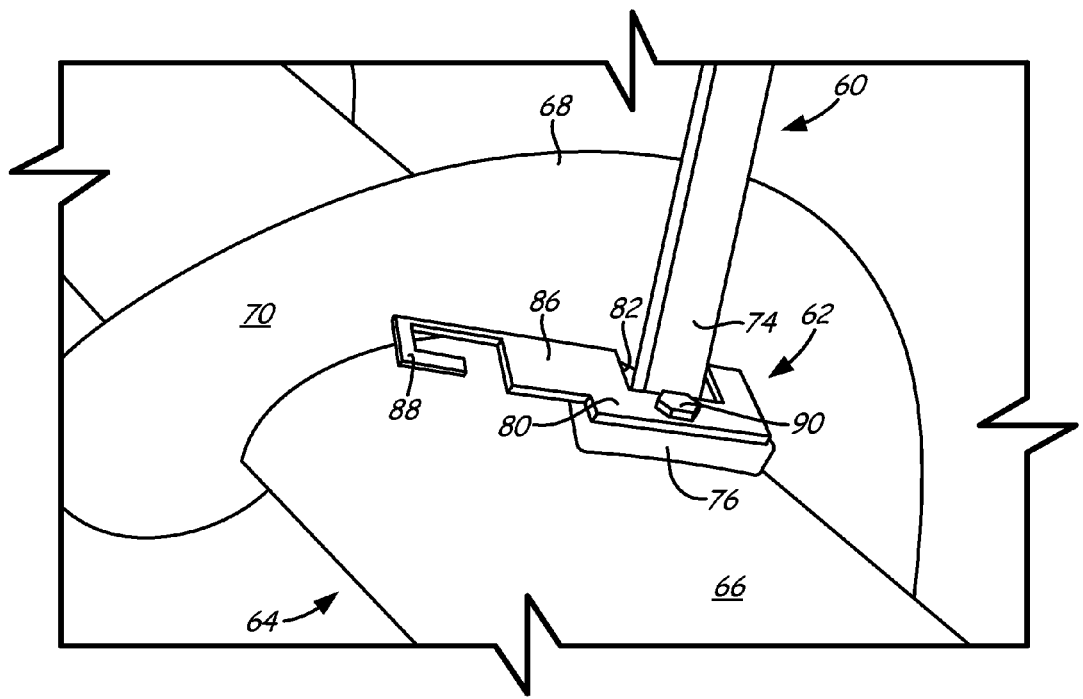
FIG. 6 is a perspective view of another embodiment of a finger and associated bracket attached to an auger in a use position.
Figure 7:
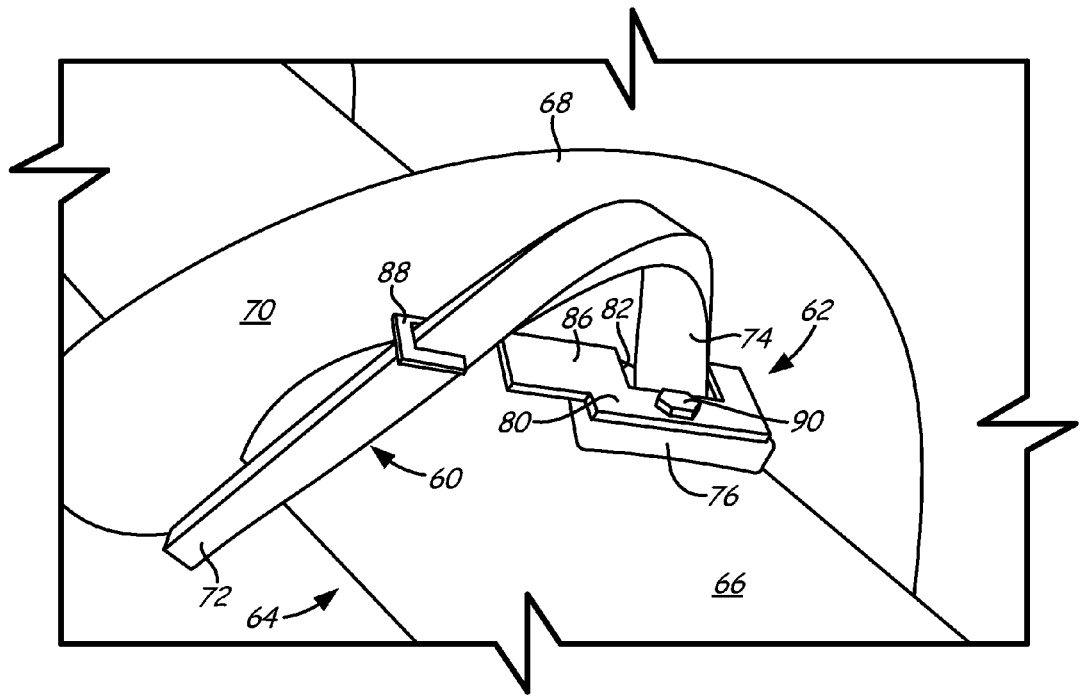
FIG. 7 is a perspective view of the finger and bracket from FIG. 6 in a non-use position.
Figure 8:
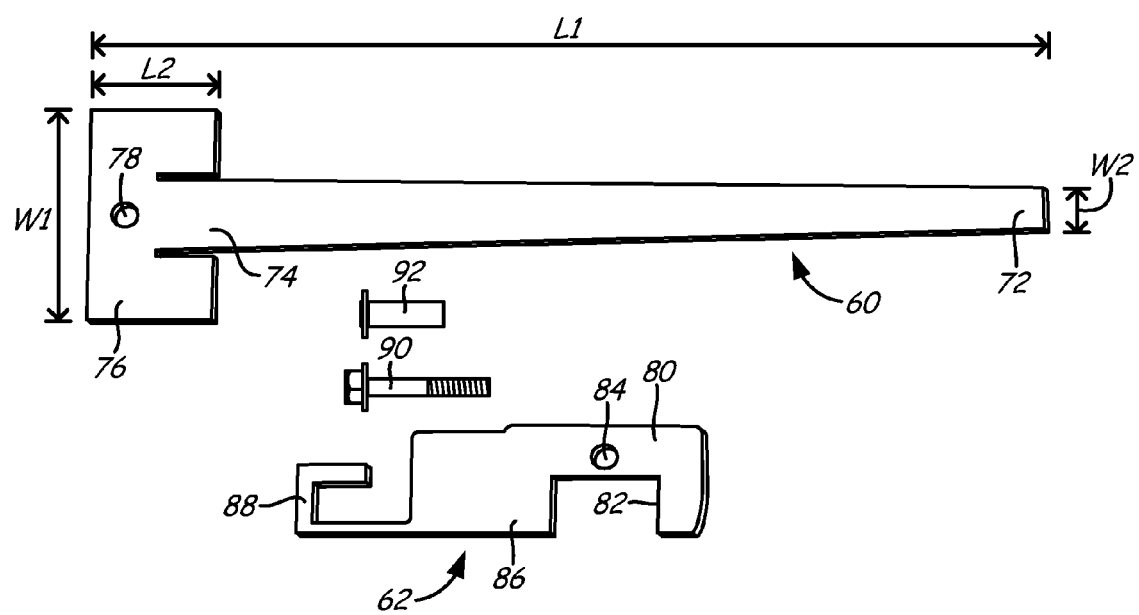
FIG. 8 is a top view of the finger and bracket removed from the auger of FIGS. 6-7 and disassembled.

FIG. 6 is a perspective view of another embodiment of finger 60 and associated bracket assembly 62 attached to auger 64 and ready for use. FIG. 7 is a perspective view of the same, but in a non-use position. Auger 64 includes tube 66, flighting 68, and outer facing surface 70. Finger 60 includes free end 72, fixed end 74, enlarged base 76, and hole 78. Bracket assembly 62 includes body 80, cut-out 82, hole 84, arm 86, catch 88, bolt 90, and blind threaded insert 92. FIG. 8 is a top view of finger 60 and bracket assembly 62 removed from auger 66 of FIGS. 6-7 and disassembled to show components. In the embodiment depicted in FIGS. 6-8, bracket assembly 62 is configured to attached finger 60 to tube 66 of auger 14 adjacent flighting 70.

Auger 64 is similar to auger 14 described above with reference to FIGS. 1-4. Auger 64 includes horizontally extending tube 66 and flighting 68 spiraling along tube 66. Flighting 68 has center facing surface 70, which faces toward a center of corn head (i.e. feeder house opening 26 shown in FIG. 1). Finger 60 is similar to finger 12 described above with reference to FIGS. 1-50. Finger 70 includes free end 72, and opposite fixed end 74 for attachment to auger 64. In contrast to finger 12, fixed end 74 of finger 70 includes a substantially rectangular enlarged base 76 and a centrally located hole 78. Bracket assembly 62 is similar to bracket assembly 46 described above with reference to FIGS. 4-6. Bracket assembly 62 includes body 80 for receiving fixed end 74 of finger. In contrast to tubular body 48 of bracket assembly 46, body 80 of bracket assembly 62 is substantially planar and includes cut-out 82 for accommodating finger 12. Hole 84 extends through body 80 just above cut-out 82, and is configured to receive bolt 90. Extending laterally from body 80 is substantially rectangular arm 86, which terminates in catch 88. In other words, catch 88 is located opposite cut-out 82 and the two structures open in opposing directions.

To attach finger 60 to auger 64, a hole is drilled into tube 66 adjacent center facing surface 70 of flighting 98. Blind threaded insert 92 is inserted into the hole of tube 66. Enlarged base 76 of finger is placed on tube 66 such that hole 78 aligns with the hole of tube 66 containing blind threaded insert 92. Slits extending between enlarged base 76 and fixed end 74 allow enlarged base 76 to lie flat on tube 66 while free end 72 extends vertically upwards as shown in FIG. 6. Body 80 is placed on top of enlarged base 76 such that enlarged base 76 is sandwiched between body 80 and tube 66. Cut-out 82 surrounds fixed end 74 and the opening faces toward center facing surface 70 of flighting 68. Bolt 90 extends through hole 84 in body 80, through hole 78 in enlarged base 76 and into blind threaded insert 92 within hole of tube 66 thereby securing bracket assembly 62 and finger 60 to auger 64.

FIG. 6 shows finger 60 in a use position where free end 72 extends radially from tube 66 to operate as described above for finger 12 with reference to FIGS. 1-3. FIG. 7 shows finger 60 in a non-use position, which may be implemented when function of finger 60 is not needed (e.g. wet field conditions) in order to prolong life of finger 60. For non-use, free end 72 is simply pulled forward (i.e. away from center facing surface 70) and folded so that a middle of finger 60 can be received by catch 88. Catch 88 holds finger 60 in a bent configuration where free end 72 does not extend beyond flighting 68. To initiate use of finger 60, simply pull finger 60 forwardly and out of catch 88 so it resumes the vertical orientation shown in FIG. 6.

While finger 60 (as well as finger 12) can take many forms, certain dimensions and materials have proven effective. In the embodiment depicted in FIG. 8, finger 60 comprises 70A durometer polyurethane. Other flexible and durable materials (e.g. metal, cable, belting, plastic, rubber) capable of ingestion by a combine without causing damage are also contemplated. An overall length of finger 60 is between about 25.4 cm (10 inches) and 50.8 cm (20 inches). In FIG. 8, overall length L1 of finger 60 is 35.56 cm (14 inches). Length of enlarged base 76 is between about 2.54 cm (1 inch) and 7.62 cm (3 inches). In FIG. 8, length L2 of enlarged base 76 is 4.45 cm (1.75 inches). Width of enlarged base 76 is between about 5.08 cm (2 inches) and 10.16 cm (4 inches). In FIG. 8, width W1 of enlarged base 76 is 7.62 cm (3 inches). Width of free end 72 is between about 0.25 cm (0.1 inches) and 2.54 cm (1 inch). In FIG. 8, width W2 of free end 72 is 1.27 cm (0.5 inches). Width of finger 60 tapers from the attachment of fixed end 72 with enlarged base 76 to free end 72. Finger 60 thickness is uniform and between about 0.25 cm (0.1 inches) and 2.54 cm (1 inch). In FIG. 8, finger 60 is 1.27 cm (0.5 inches) thick.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A corn head comprising:
 a frame including a feeder house opening and a trough located in front of the feeder house opening;
 an auger rotatably mounted in the trough, the auger having a tube and flighting for directing material into the feeder house opening;
 a plurality of row units located in front of the trough, each row unit having a gearbox and chains for conveying material to the trough; and
 a plurality of flexible fingers, each flexible finger positioned over a center of the gearbox to align with one of the plurality of row unit; and
 each of the plurality of flexible fingers attached to the auger and extending radially outward from the auger and rotating therewith.

2. The corn head of claim 1, wherein the finger contacts the gearbox during rotation of the auger.

3. The corn head of claim 1, further comprising:
 a stripper bar attached to the frame,
 wherein the finger is configured to contacts the stripper bar during rotation of the auger.

4. The corn head of claim 1, wherein the finger extends radially past the flighting.

5. The corn head of claim 1, wherein the finger is attached to the tube of the auger.

6. The corn head of claim 1, wherein the finger is attached to the flighting of the auger.

7. A combine attachment comprising:
 an auger having flighting for directing material to a feeder house opening, the flighting extending radially a first distance from the auger; and
 a finger having a fixed end secured to the auger adjacent the flighting and a free end extending radially a second distance from the auger, wherein the second distance is greater than the first distance;
 a bracket; and
 a bolt attaching the bracket and the finger to the auger;
 wherein the bracket includes a catch configured to retain the finger in a bent configuration.

8. The combine attachment of claim 7, wherein the finger comprises a flexible material.

9. The combine attachment of claim 7, wherein the finger comprises ployurethane.

10. The combine attachment of claim 7, wherein the finger comprises tubing.

11. The combine attachment of claim 7, wherein the second distance is approximately twice the first distance.

12. The combine attachment of claim 7, wherein the second distance is between 25 and 50 inches.

13. A corn head comprising:
 a plurality of snouts located at a front of the corn head, each snout including a gathering point for guiding material into the corn head;
 a plurality of row units located behind the plurality of snouts, each row unit including a bonnet attached to one of the snouts and a conveyor system beneath the bonnet for conveying the material rearward along the corn head;
 a frame located behind the plurality of row units, the frame including a trough for collecting material received from the plurality of row units and a feeder house opening for transferring the material to a combine;
 an auger rotatably mounted in the trough, the auger including a tube and flighting extending radially from the tube for directing the material into the feeder house opening;

a finger attached to the auger, the finger extending radially outward from the auger and contacting the trough during rotation; and a bracket that includes a catch configured to retain the finger in a non-use position.

14. The corn head of claim 13, wherein the finger includes an enlarged base secured to the tube.

15. The corn head of claim 14, wherein the enlarged base is secured to the tube by a bolt.

16. The corn head of claim 15, wherein the enlarged base is secured between the bracket and the tube by the bolt.

* * * * *